(12) United States Patent
Miyata et al.

(10) Patent No.: US 6,980,380 B2
(45) Date of Patent: Dec. 27, 2005

(54) MASTER INFORMATION CARRIER AND METHOD FOR MANUFACTURING MAGNETIC DISK

(75) Inventors: Keizo Miyata, Kadoma (JP); Hideyuki Hashi, Kadoma (JP); Tatsuaki Ishida, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 234 days.

(21) Appl. No.: 10/330,172

(22) Filed: Dec. 27, 2002

(65) Prior Publication Data

US 2003/0123170 A1  Jul. 3, 2003

(30) Foreign Application Priority Data

Dec. 28, 2001  (JP)  ............................. 2001-400828

(51) Int. Cl.⁷ .............................................. G11B 5/86
(52) U.S. Cl. ......................................... 360/17; 360/16
(58) Field of Search ........................... 360/15–17, 48, 360/131

(56) References Cited

U.S. PATENT DOCUMENTS

| | | | |
|---|---|---|---|
| 5,935,674 A | * | 8/1999 | Saito et al. ............... 428/847.3 |
| 6,347,016 B1 | * | 2/2002 | Ishida et al. .................. 360/17 |
| 6,762,892 B2 | * | 7/2004 | Hamada et al. ............... 360/17 |
| 2002/0051307 A1 | * | 5/2002 | Nishikawa et al. ........... 360/17 |

FOREIGN PATENT DOCUMENTS

| | | |
|---|---|---|
| EP | 0 915 456 | 5/1999 |
| JP | 10-40544 | 2/1998 |
| JP | 10-269566 | 10/1998 |

* cited by examiner

Primary Examiner—David Hudspeth
Assistant Examiner—Dismery Mercedes
(74) Attorney, Agent, or Firm—Hamre, Schumann, Mueller & Larson, P.C.

(57) ABSTRACT

A master information carrier includes a high-level region and a low-level region that are formed on a non-magnetic base. The high-level region includes a ferromagnetic thin film pattern that corresponds to preformat information signals. The master information carrier is brought into close contact with a magnetic disk by exhausting a gas from a hole of the magnetic disk to generate negative pressure in a space between the low-level region and the magnetic disk. In this case, to prevent deformation of the central portion of the master information carrier, an inner edge of the high-level region in the radial direction is extended to the vicinity of a hole edge of the magnetic disk so that a portion of the high-level region comes into contact with the vicinity of the hole edge. This configuration can improve the close contact between the master information carrier and the magnetic disk, thus achieving higher reliability of magnetic transfer recording.

7 Claims, 9 Drawing Sheets

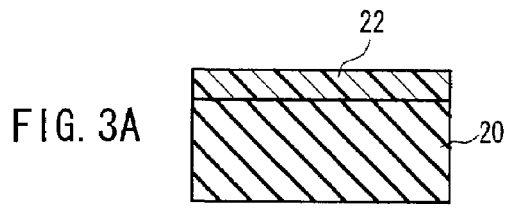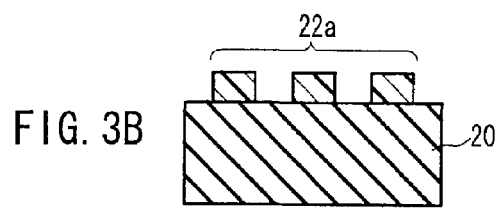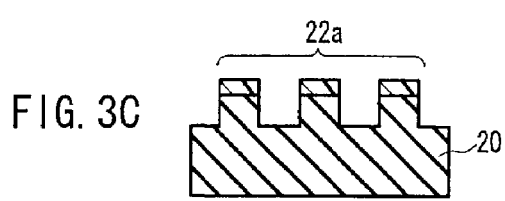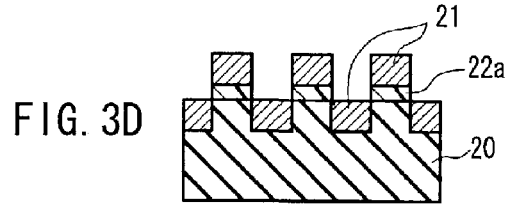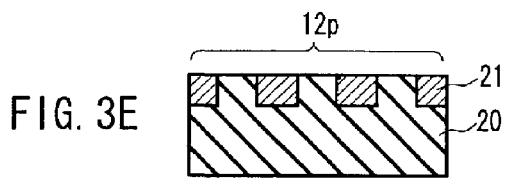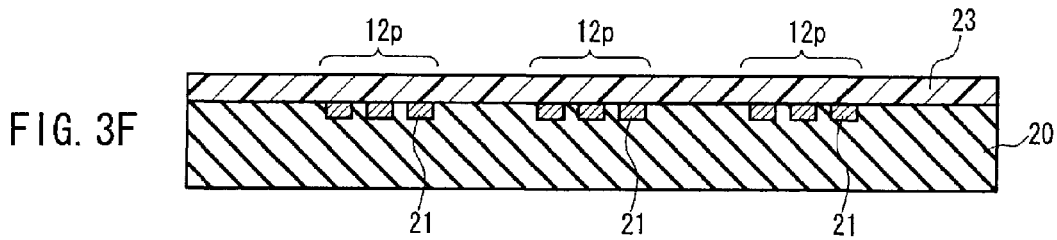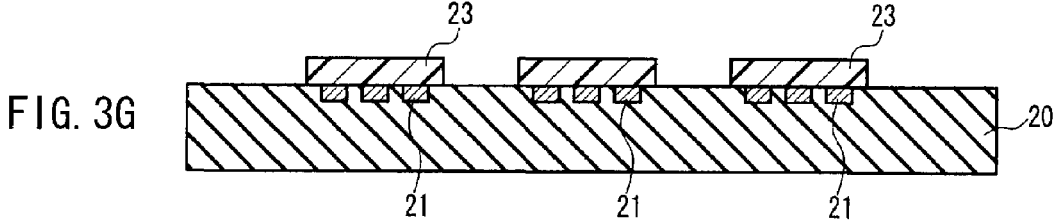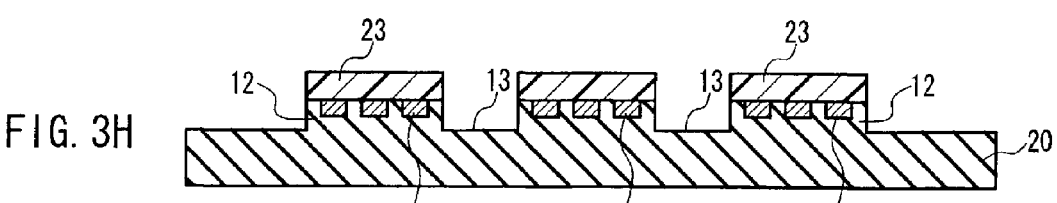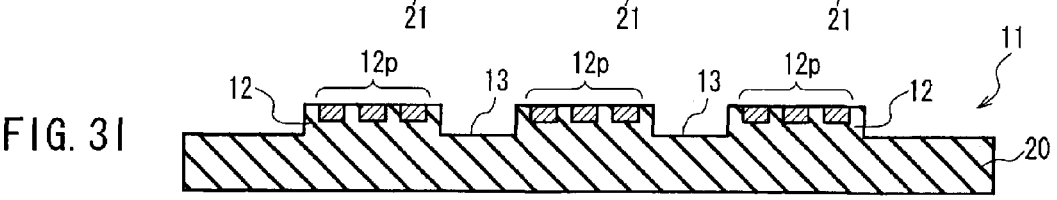

MASTER INFORMATION CARRIER AND METHOD FOR MANUFACTURING MAGNETIC DISK

BACKGROUND OF THE INVENTION

1. Field of the Invention

The present invention relates to a master information carrier used for recording information signals such as preformat information on a magnetic disk. In particular, the present invention relates to a master information carrier that includes a high-level region formed on a base, the high-level region being made higher than the other regions and including a ferromagnetic thin film pattern in correspondence with the information signals. Moreover, the present invention relates to a method for manufacturing a magnetic disk with the master information carrier.

2. Description of the Related Art

The recording density of a magnetic recording/reproducing device is increasing to achieve small size and large capacity. In the field of a hard disk drive, which is a typical magnetic recording/reproducing device, an areal recording density of more than 20 Gbits/in$^2$ (31.0 Mbits/mm$^2$) is already available on the market, and the technology proceeds with such a rapid pace that an areal recording density of 40 Gbits/in$^2$ (62.0 Mbits/mm$^2$) is expected within a couple of years.

Part of the technical background that has enabled such a high recording density is an increase in linear recording density resulting from the improvements in a magnetic recording medium and head-disk interface performance and new signal processing methods such as partial response.

However, the rate of increase in track density exceeds the rate of increase in linear recording density in recent years, and thus becomes a primary factor of an increase in areal recording density. This is because a magnetoresistive-type head, whose reproduction output performance is superior to that of a conventional inductive-type head, has been put to practical use.

At present, it is possible to reproduce signals from tracks having a width of not more than several micrometers with a high S/N ratio by using a magnetoresistive-type head. Moreover, it is expected that, with a further improvement in head performance, the track pitch will reach the submicron range in the near future.

To reproduce a signal with a high S/N ratio by scanning such a narrow track precisely with a magnetic head, the tracking servo technique for the magnetic head plays an important role. A current hard disk drive has preformat recording regions that are disposed at predetermined angular intervals over the entire circumference of a magnetic disk (magnetic recording medium), i.e., 360 degrees, and signals such as a tracking servo signal, an address information signal and a reproduction clock signal are recorded in the preformat recording regions. A magnetic head can monitor its position by reproducing these signals at predetermined intervals and scan a track precisely while correcting any displacement in the radial direction of the magnetic disk.

The preformat information signals, such as the tracking servo signal, the address information signal, and the reproduction clock signal, serve as reference signals for precisely scanning a track with the magnetic head. Therefore, the track positioning accuracy is required for recording these signals.

The following is a brief explanation of the technical and historical development of a master information carrier that is addressed by the present invention.

(1) First Stage: Use of Special Servo-track Recording Device

A current hard disk drive records the tracking servo signal, the address information signal, and the reproduction clock signal etc. with a unique magnetic head built into the drive by using a special servo-track recording device after a magnetic recording medium (hard disk) and the magnetic head have been incorporated into the drive. In this case, the necessary track positioning accuracy can be achieved by performing preformat recording while precisely controlling the position of the unique magnetic head built into the drive with an external actuator provided in the servo-track recording device.

However, the conventional technique for performing preformat recording with the unique magnetic head built into the drive by using the special serve-track recording device has the following problems.

First, the above recording method is "linear recording with a relative movement." That is, recording with a magnetic head basically is linear recording achieved by the relative movement between a magnetic head and a magnetic recording medium. Therefore, the method in which the position of the magnetic head is controlled precisely by using the special servo-track recording device requires a lot of time for preformat recording.

Moreover, the use of the special servo-track recording device also is a problem. Since the special serve-track recording device is quite expensive, the cost needed for preformat recording is increased.

This problem becomes more conspicuous as the track density of a magnetic recording/reproducing device is improved. In addition to the increased number of tracks in the radial direction of a disk, the track density also is improved with an increase in recording density. Thus, it is necessary to achieve higher positioning accuracy of a magnetic head. Therefore, the angular intervals per one revolution of the disk should be reduced, where the preformat recording regions for recording information signals such as the tracking servo signal are provided. Accordingly, the amount of signals to be preformat-recorded on the magnetic disk increases with an increase in recording density of the device, so that a lot of time is required for preformat recording.

Although there is a tendency to reduce the diameter of a magnetic disk medium, e.g., to 2.5 inches or 1.8 inches, the demand for disks having a large diameter of 3.5 inches or 5 inches is still great. The amount of signals to be preformat-recorded increases with an increase in recording area of the disk. Therefore, the cost performance of such large-diameter disks is affected significantly by the time required for preformat recording.

Second, there is a problem about "dynamic linear recording with a relative movement." That is, a recording magnetic field is broadened (a) by a spacing between a magnetic head and a magnetic recording medium and (b) by the pole shape at the tip of the magnetic head. Therefore, the magnetization transition lacks sharpness at the ends of a track on which signals are preformat-recorded.

Since recording with a magnetic head basically is dynamic linear recording achieved by the relative movement between a magnetic head and a magnetic recording medium, a certain amount of spacing has to be provided between the magnetic head and the magnetic recording medium in view of interface performance therebetween. Moreover, the pole shape at the tip of the current magnetic head includes two elements that are used separately for recording and reproduction. Therefore, a pole width on the trailing edge side of a recording gap corresponds to a recording track width, and a pole width on the leading edge side is at least twice as large as the recording track width. Such a large pole on the leading edge side also serves to shield a MR head for reproduction.

Both the spacing and the pole shape at the tip of the magnetic head cause the recording magnetic field to broaden at the ends of a recording track. As a result, the magnetization transition lacks in sharpness at the ends of a recording track on which signals are preformat-recorded, or erased regions are formed on both ends of the track.

In the current tracking servo technique, the position of a magnetic head is detected based on the amount of change in reproduction output when the magnetic head deviates from the track to be scanned. Therefore, as with the case where data signals recorded between the servo areas are reproduced, it is necessary to achieve not only an excellent SIN ratio when the magnetic head scans a track precisely but also a sharp change in reproduction output when the magnetic head deviates from the track to be scanned, i.e., a sharp off-track characteristic.

Thus, a lack of sharpness in magnetization transition at the ends of a track on which signals are preformat-recorded makes it difficult to achieve precise tracking servo technique that will be used in recording signals on submicron tracks in the future.

(2) Second Stage: Introduction of Master Information Carrier (Transfer Recording Technique)

To solve the two problems in preformat recording with a magnetic head, there is an idea of using a master information carrier as an original master. The master information carrier includes a base on which a ferromagnetic thin film pattern that corresponds to preformat information signals is formed.

JP 10(1998)-40544 A discloses the following technique: bringing the surface of a master information carrier into contact with the surface of a magnetic recording medium; magnetizing a ferromagnetic thin film pattern that is formed on the master information carrier so as to correspond to information signals; and transferring and recording a magnetization pattern that corresponds to the ferromagnetic thin film pattern onto the magnetic recording medium.

This preformat recording technique makes it possible to perform favorable and efficient preformat recording without sacrificing other important performances such as the S/N ratio and the interface performance of the recording medium.

To make the master information recording technique disclosed in JP 10(1998)-40544 A effective, it is necessary to ensure uniform contact between the ferromagnetic thin film pattern and the magnetic recording medium during transfer recording.

(3) Third Stage: Further Improvement in Master Information Carrier (High Level Region and Low Level Region)

JP 10(1998)-269566 A discloses the following technique: at least a portion of the surface of a region including no ferromagnetic thin film pattern is made lower than that of a region including the ferromagnetic thin film pattern that corresponds to information signals. The higher region where the ferromagnetic thin film pattern that corresponds to information signals is formed is referred to as a high-level region, while the lower region where no ferromagnetic thin film pattern is formed is referred to as a low-level region.

According to this technique, only the high-level region of a master information carrier can be brought into contact with a magnetic recording medium and the low-level region is not in contact with the magnetic recording medium. In other words, the contact with the magnetic recording medium is not made over the entire surface of the master information carrier, but in part thereof. Thus, improved contact can be established between the ferromagnetic thin film pattern that corresponds to information signals and the magnetic recording medium. Moreover, when the master information carrier is brought into contact with the magnetic recording medium, a gas contained in a space between the low-level region and the magnetic recording medium is exhausted so as to generate negative pressure. Thus, the close contact between the high-level region and the magnetic recording medium further can be enhanced by the action of atmospheric pressure.

FIGS. 9A and 9B show an example of the above master information carrier. FIG. 9A is a plan view of the master information carrier, and FIG. 9B is an enlarged cross-sectional view taken along the alternate long and short dashed line 9B—9B of FIG. 9A. In FIG. 9A, a master information carrier 41 is substantially circular in shape and has an orientation flat 41a. The master information carrier 41 includes a high-level region 42 where a ferromagnetic thin film pattern 42p (indicated by hatching) is formed so as to correspond to preformat information signals, and a low-level region 43 where no ferromagnetic thin film pattern is formed. The surface level of the low-level region 43 is made lower than that of the high-level region 42, so that the master information carrier 41 has an uneven surface.

When the master information carrier 41 with such an uneven surface is used to record preformat information signals on a magnetic disk, the master information carrier 41 should come into close contact with a magnetic disk 51 (indicated by the alternate long and two short dashed line in FIG. 9B). At this time, an exhaust path 45 is formed according to a difference in height between the high-level region 42 (having a height of h1) and the low-level region 43 (having a height of h2). By exhausting a gas contained in this exhaust path 45 from a hole of the magnetic disk, negative pressure is generated in the low-level region 43, and thus the high-level region 42 uniformly contacts the magnetic disk 51 due to the action of atmospheric pressure. Then, an external magnetic field is applied while maintaining the close contact, so that the preformat information signals corresponding to the ferromagnetic thin film pattern 42p are transferred and recorded onto a magnetic recording layer formed on the surface of the magnetic disk 51.

When a gas contained in the exhaust path 45 between the low-level region 43 and the magnetic disk 51 is exhausted from the hole of the magnetic disk 51, larger negative pressure may be generated in the central portion of the master information carrier 41. Consequently, the portion of the master information carrier 41 that corresponds to the hole of the magnetic disk 51 may be drawn and deformed.

FIG. 10 is a cross-sectional view schematically showing an apparatus for performing the transfer recording of information signals onto a magnetic disk with a master information carrier. A magnetic disk 51, to which information signals are transferred, is held by a disk-supporting member 61. The disk-supporting member 61 includes a suction hole 61a, and an exhaust duct 61b is connected to the end portion of the suction hole 61a. Further, an exhaust device 61c is provided at the end portion of the exhaust duct 61b. This exhaust device 61c operates to produce negative pressure in a space between the magnetic disk 51 and the master information carrier 41 through the exhaust duct 61b, the suction hole 61a, and the hole 51b of the magnetic disk 51. Thus, the master information carrier 41 is drawn toward the magnetic disk 51. Although negative pressure also is generated in the low-level region located between the high-level regions of the master information carrier 41, larger negative pressure is exerted on the central portion of the master information carrier 41 that is opposite to the hole 51b of the magnetic disk 51. Therefore, the master information carrier 41 is deformed easily in the central portion by such high suction force. FIG. 10 is exaggerated for purposes of illustrating deformation of the master information carrier 41 with its central portion drawn. Since the base of the master information carrier 41 is a rigid body, the close contact between the high-level region 42 of the master information carrier 41 and the magnetic disk 51 may be degraded partly by the deformation.

In transfer recording that uses a master information carrier, it is very important to prevent deformation of the master information carrier when the high-level region including the ferromagnetic thin film pattern comes into close contact with a magnetic disk by exhausting a gas contained in a space between the low-level region and the magnetic disk.

SUMMARY OF THE INVENTION

Therefore, with the foregoing in mind, it is an object of the present invention to provide a highly reliable master information carrier that can be used in the transfer recording of preformat information signals onto a magnetic disk and can achieve uniform contact between a ferromagnetic thin film pattern formed in a high-level region and the magnetic disk. It is another object of the present invention to provide a method for manufacturing a magnetic disk on which information signals can be magnetically transferred precisely with a master information carrier.

A first master information carrier of the present invention includes the following: a disk-shaped base; a high-level region; a low-level region differing from the high-level region in level; and a ferromagnetic thin film pattern formed in the surface of the high-level region so as to correspond to an information signal. The high-level region, the low-level region, and the ferromagnetic thin film pattern are provided on the disk-shaped base. The master information carrier is superimposed on a magnetic disk with the ferromagnetic thin film pattern in close contact with the surface of the magnetic disk, and the application of an external magnetic field allows the information signal to be transferred and recorded onto the magnetic disk. When the master information carrier is superimposed on the magnetic disk, at least a portion of the high-level region comes into contact with the vicinity of a hole edge of the magnetic disk.

A second master information carrier of the present invention includes the following: a disk-shaped base; a first high-level region and a second high-level region, the first high-level region being flush substantially with the second high-level region; a low-level region differing from the first high-level region and the second high-level region in level; and a ferromagnetic thin film pattern formed in the surface of the first high-level region so as to correspond to an information signal. The first high-level region, the second high-level region, the low-level region, and the ferromagnetic thin film pattern are provided on the disk-shaped base. The master information carrier is superimposed on a magnetic disk with the ferromagnetic thin film pattern in close contact with the surface of the magnetic disk, and the application of an external magnetic field allows the information signal to be transferred and recorded onto the magnetic disk. When the master information carrier is superimposed on the magnetic disk, at least a portion of the second high-level region comes into contact with the vicinity of a hole edge of the magnetic disk.

A method for manufacturing a magnetic disk of the present invention includes the following: superimposing the first or the second master information carrier of the present invention on a magnetic disk; bringing the master information carrier into close contact with the magnetic disk by exhausting a gas from a hole of the magnetic disk to generate negative pressure in a space between the master information carrier and the magnetic disk; and transferring and recording an information signal onto the magnetic disk by application of an external magnetic field, the information signal corresponding to the ferromagnetic thin film pattern formed on the master information carrier.

BRIEF DESCRIPTION OF THE DRAWINGS

FIGS. 3A to 3I are cross-sectional views showing an example of a method for manufacturing a master information carrier of Embodiment 1 of the present invention in the order of process.

DESCRIPTION OF THE PREFERRED EMBODIMENTS

Figure 10:
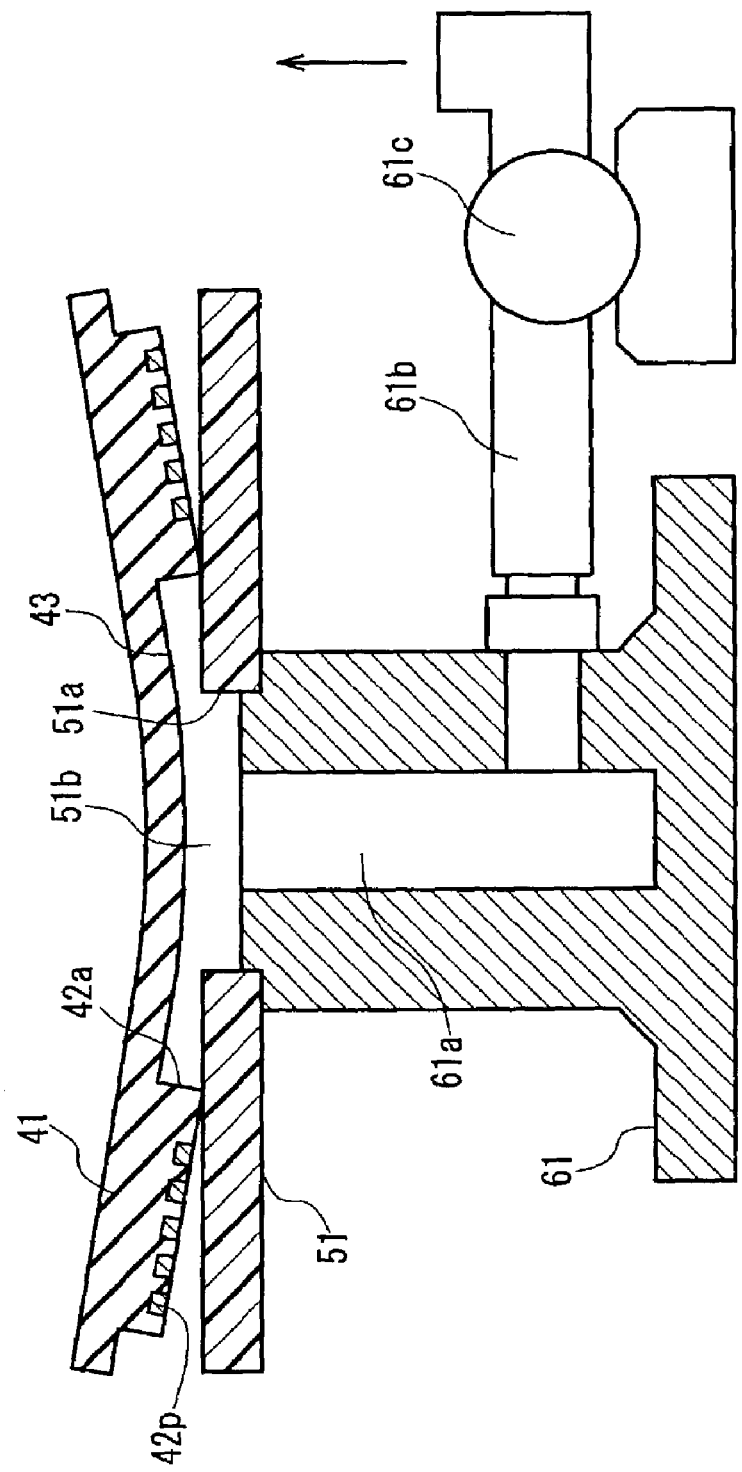
FIG. 10 is a cross-sectional view schematically showing the configuration of an apparatus for bringing a master information carrier into close contact with a magnetic disk.

As a result of studies on deformation of a master information carrier 41 as shown in FIG. 10, the present inventors reached the conclusion that the deformation occurs because a high-level region of the master information carrier 41 is not formed near a hole 51b of a magnetic disk 51.

Figure 9A:
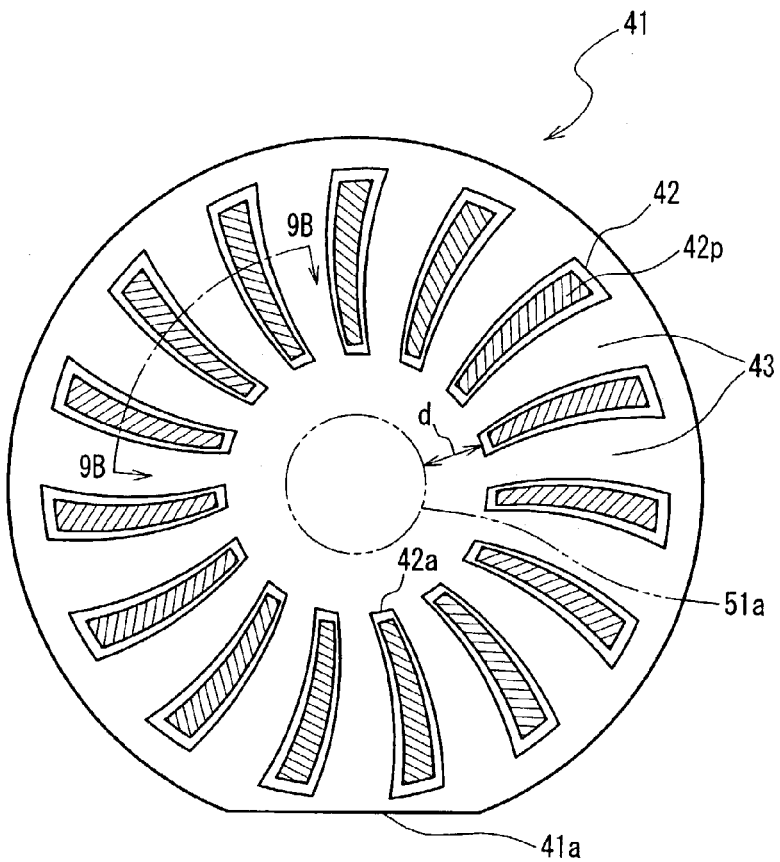
FIG. 9A is a plan view schematically showing the configuration of a conventional master information carrier.
Figure 9B:
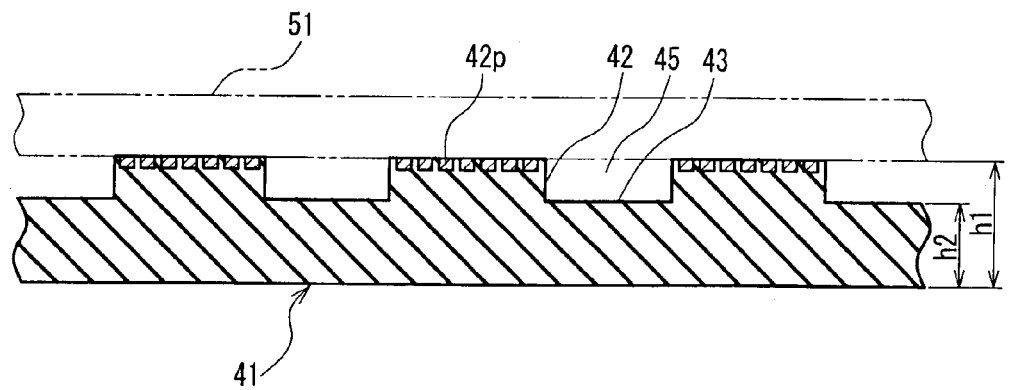
FIG. 9B is an enlarged cross-sectional view taken along the arc 9B—9B of FIG. 9A.

FIG. 9A shows a hole edge 51a of the magnetic disk 51 when the master information carrier 41 is superimposed on the magnetic disk 51. The hole edge 51a is indicated by the alternate long and two short dashed line. In this magnetic disk, a recording region for information signals is not extended to the vicinity of the hole. This is because a region is required for fixing the magnetic disk to a spindle motor provided in a hard disk drive. Specifically, in the case of a general 3.5-inch hard disk drive, the innermost radius of the recording region is 18 mm to 22 mm, though the hole radius of the magnetic disk is 12.5 mm.

The edges (i.e., the boundary between a high-level region and a low-level region) that define a high-level region 42 where a ferromagnetic thin film pattern is formed have been determined so that the high-level region 42 is made as small as possible, while including the ferromagnetic thin film pattern. Therefore, as shown in FIG. 9A, among the edges that define the high-level region 42, the edge 42a located inside in the radial direction (hereinafter, referred to as "inner edge") is spaced from the hole edge 51a by a distance d when the master information carrier 41 is superimposed on the magnetic disk 51. This is considered as the cause of deformation of the master information carrier 41 in its central portion. Assuming that the inner edge 42a of the high-level region 42 is extended to the central portion of the master information carrier 41, the master information carrier 41 contacts the magnetic disk 51 also in the central portion. Thus, it is considered that deformation in the central portion of the master information carrier can be reduced.

The present invention is directed to preventing poor contact between a master information carrier and a magnetic disk caused by deformation of the master information carrier.

A first master information carrier of the present invention includes the following: a disk-shaped base; a high-level region; a low-level region differing from the high-level region in level; and a ferromagnetic thin film pattern formed in the surface of the high-level region so as to correspond to an information signal. The high-level region, the low-level region, and the ferromagnetic thin film pattern are provided on the disk-shaped base. The master information carrier is superimposed on a magnetic disk with the ferromagnetic thin film pattern in close contact with the surface of the magnetic disk, and the application of an external magnetic field allows the information signal to be transferred and recorded onto the magnetic disk. When the master information carrier is superimposed on the magnetic disk, at least a portion of the high-level region comes into contact with the vicinity of a hole edge of the magnetic disk.

A second master information carrier of the present invention includes the following: a disk-shaped base; a first high-level region and a second high-level region, the first high-level region being flush substantially with the second high-level region; a low-level region differing from the first high-level region and the second high-level region in level; and a ferromagnetic thin film pattern formed in the surface of the first high-level region so as to correspond to an information signal. The first high-level region, the second high-level region, the low-level region, and the ferromagnetic thin film pattern are provided on the disk-shaped base. The master information carrier is superimposed on a magnetic disk with the ferromagnetic thin film pattern in close contact with the surface of the magnetic disk, and the application of an external magnetic field allows the information signal to be transferred and recorded onto the magnetic disk. When the master information carrier is superimposed on the magnetic disk, at least a portion of the second high-level region comes into contact with the vicinity of a hole edge of the magnetic disk.

When the first master information carrier is superimposed on the magnetic disk, the high-level region of the first master information carrier comes into contact with the vicinity of the hole edge of the magnetic disk. When the second master information carrier is superimposed on the magnetic disk, the second high-level region of the second master information carrier comes into contact with the vicinity of the hole edge of the magnetic disk. To generate negative pressure in an exhaust path between the low-level region of the master information carrier and the magnetic disk, a gas is exhausted from the hole of the magnetic disk. In this case, even if larger negative pressure is generated in the central portion of the master information carrier and causes deformation, both of the above configurations can minimize the deformation. Therefore, it is possible to ensure favorable close contact between the ferromagnetic thin film pattern formed in the high-level region (or the first high-level region) of the master information carrier and the magnetic disk. Thus, a master information carrier that is highly reliable in transfer recording of information signals can be achieved.

It is preferable that when the first or the second master information carrier is superimposed respectively on the magnetic disk, an inner edge of the high-level region (or the second high-level region) is located outside the hole edge of the magnetic disk in the radial direction.

There may be some burrs or foreign substances on the rim of the hole of the magnetic disk, e.g., due to processing the hole and handling the disk. The high-level region (or the second high-level region) does not come into contact with this portion, thus preventing the degradation of close contact between the ferromagnetic thin film pattern and the magnetic disk.

When the first or the second master information carrier is superimposed respectively on the magnetic disk, a radial distance between the inner edge of the high-level region (or the second high-level region) and the hole edge of the magnetic disk is preferably not more than 6 mm, and more preferably not more than 2 mm.

When the master information carrier is superimposed on the magnetic disk with the radial distance greater than the above value, the amount of deformation of the master information carrier increases as a gas is exhausted from the hole of the magnetic disk, resulting in poor contact between the ferromagnetic thin film pattern and the magnetic disk.

It is preferable that the radial distance is not less than 0.2 mm.

When the radial distance is smaller than this value, the close contact between the ferromagnetic thin film pattern and the magnetic disk may be degraded due to burrs or foreign substances on the rim of the hole of the magnetic disk.

It is preferable that the first master information carrier includes a plurality of high-level regions, and when the first master information carrier is superimposed on the magnetic disk, only the inner edges of some of the high-level regions come into contact with the vicinity of the hole edge of the magnetic disk.

This configuration allows a sufficient space to be maintained between adjacent high-level regions. Therefore, when a gas is exhausted from the hole of the magnetic disk, the ferromagnetic thin film pattern reliably can come into close contact with the magnetic disk.

In the second master information carrier, it is preferable that the second high-level region is located on the center side with respect to an inner edge of the first high-level region in the radial direction.

This configuration can optimize the arrangement of the second high-level region for preventing deformation of the master information carrier, etc. without depending on the arrangement of the first high-level region.

It is preferable that the second master information carrier includes a plurality of first high-level regions and a plurality of second high-level regions, and the number of second high-level regions is not more than the number of first high-level regions and not less than one-fourth the number of first high-level regions.

When the number of second high-level regions is more than the number of first high-level regions, a sufficient space cannot be maintained between adjacent second high-level regions. Therefore, when a gas is exhausted from the hole of the magnetic disk, the contact between the ferromagnetic thin film pattern and the magnetic disk becomes poor.

When the number of second high-level regions is less than one-fourth the number of first high-level regions, large pressure is exerted on a portion of the magnetic disk in contact with the second high-level region while a gas is exhausted from the hole of the magnetic disk. Thus, the magnetic disk may be damaged.

A method for manufacturing a magnetic disk of the present invention includes the following: superimposing the first or the second master information carrier of the present invention on a magnetic disk; bringing the master information carrier into close contact with the magnetic disk by exhausting a gas from a hole of the magnetic disk to generate negative pressure in a space between the master information carrier and the magnetic disk; and transferring and recording an information signal onto the magnetic disk by application of an external magnetic field, the information signal corresponding to the ferromagnetic thin film pattern formed on the master information carrier.

This method can suppress deformation of the master information carrier when a gas is exhausted from the hole of the magnetic disk. Therefore, it is possible to ensure favorable close contact between the ferromagnetic thin film pattern formed on the master information carrier and the magnetic disk. Thus, a highly reliable magnetic disk can be achieved, onto which information signals have been transferred and recorded precisely.

Hereinafter, specific embodiments of a master information carrier of the present invention will be described in detail with reference to the drawings.

Embodiment 1

Figure 1A:
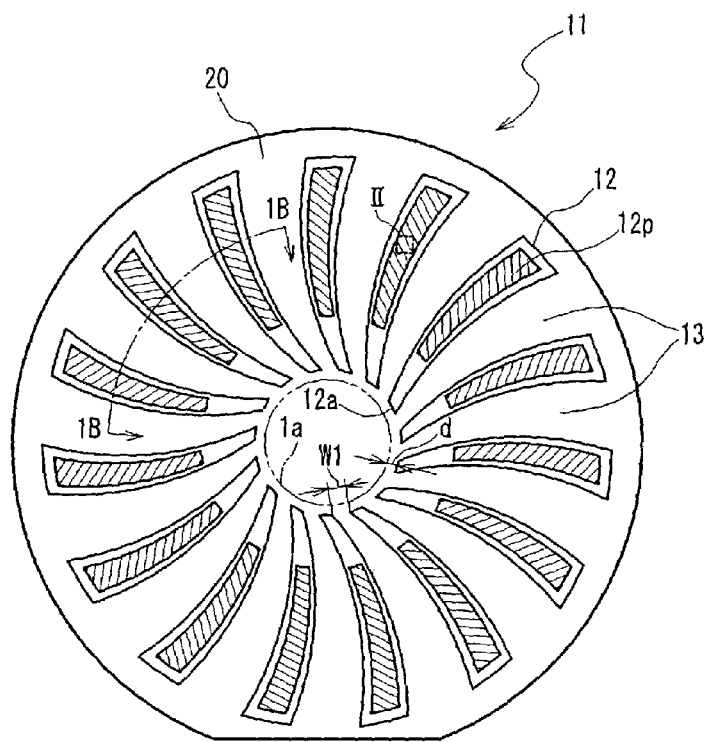
FIG. 1A is a plan view schematically showing the configuration of a master information carrier of Embodiment 1 of the present invention.
Figure 1B:
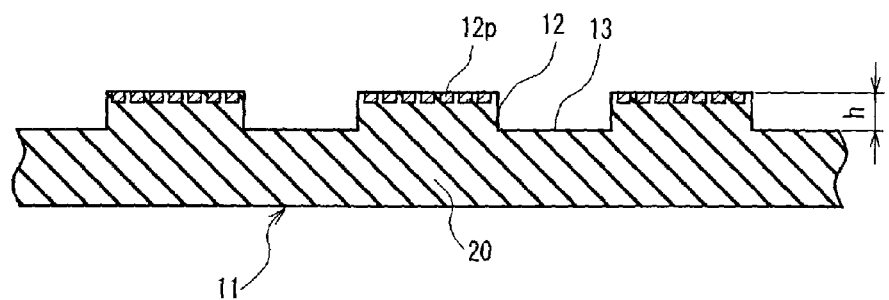
FIG. 1B is an enlarged cross-sectional view taken along the arc 1B—1B of FIG. 1A.

FIGS. 1A and 1B show the configuration of a master information carrier of Embodiment 1 of the present invention. FIG. 1A is a plan view of a disk-shaped master information carrier 11, on which narrow regions 12 that extend substantially in the radial direction are arranged at predetermined angular intervals in the circumferential direction. Each of the regions 12 includes a region where a fine ferromagnetic thin film pattern 12$p$ (indicated by hatching) is formed so as to correspond to preformat information signals. FIG. 1B is an enlarged cross-sectional view of the master information carrier 11 taken along the alternate long and short dashed line 1B—1B of FIG. 1A. As shown in FIG. 1B, the surface level of a region 13 (non-patterned region), where no ferromagnetic thin film pattern is formed, is lower than the surface level of the region 12 that includes a region (patterned region) where the ferromagnetic thin film pattern 12$p$ is formed. The region 12 with a higher surface level is referred to as a high-level region, while the region 13 with a lower surface level is referred to as a low-level region.

Both the high-level region 12 and the low-level region 13 are provided in the surface of a non-magnetic base 20.

For convenience, FIGS. 1A and 1B are simplified. Actually, however, the size and number of regions that include the ferromagnetic thin film pattern 12$p$ differ from those illustrated in the drawings, and in reality the master information carrier has, e.g., about 100 to 300 high-level regions 12.

Figure 2:
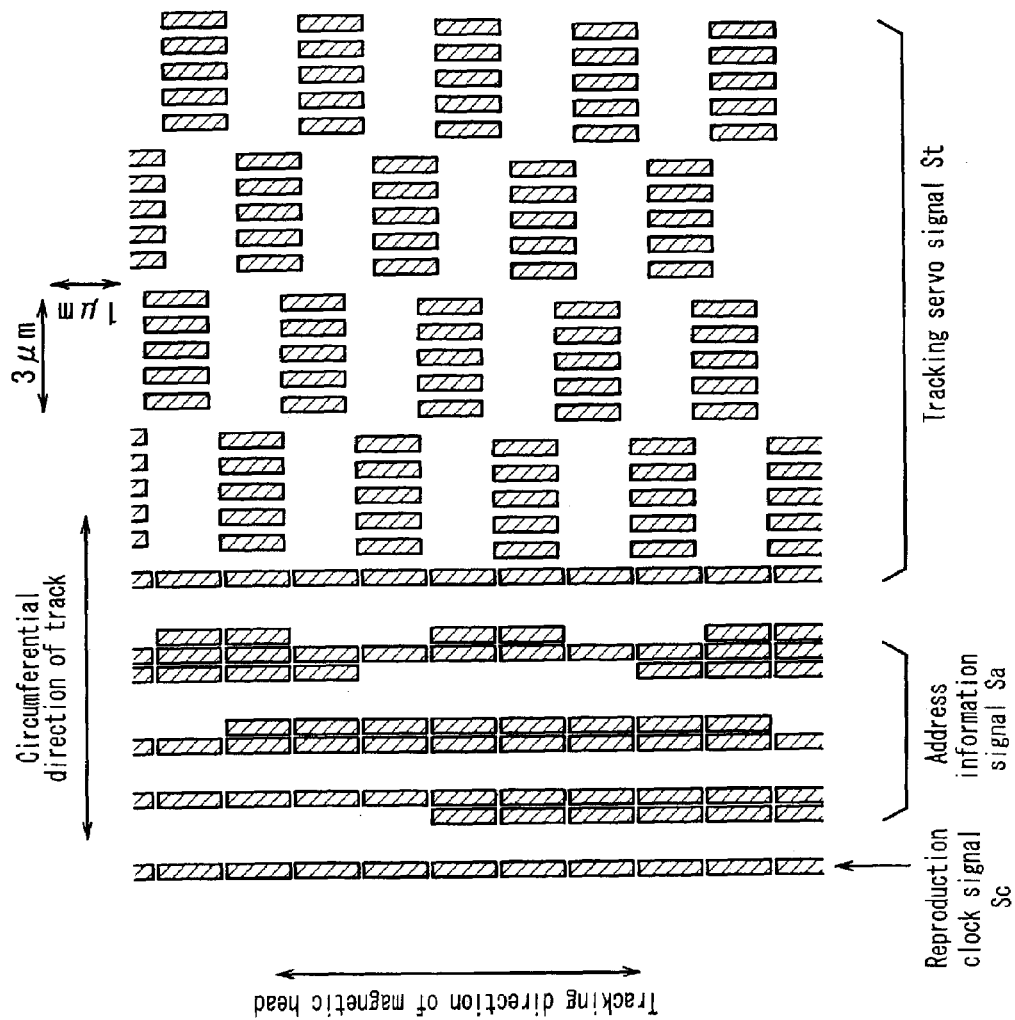
FIG. 2 is an enlarged plan view of the region II in FIG. 1A, showing an example of a ferromagnetic thin film pattern that corresponds to preformat information signals formed on the surface of a master information carrier.

FIG. 2 is an enlarged view of the region II of FIG. 1A, which is part of the high-level region 12. As shown in FIG. 2, the ferromagnetic thin film pattern that corresponds to each of a tracking servo signal St, an address information signal Sa, and a reproduction clock signal Sc are arranged in that order along the circumferential direction. In FIG. 2, hatched portions represent the thin film pattern made of a ferromagnetic material such as Co (cobalt).

Referring to FIGS. 3A to 3I, a method for forming the fine ferromagnetic thin film pattern that corresponds to the preformat information signals (the tracking servo signal, the address information signal, and the reproduction clock signal) on the surface of the master information carrier 11 is described below.

As shown in FIG. 3A, a resist layer 22 is formed on the smooth and flat surface of a non-magnetic base 20, such as glass or a silicon wafer. Then, as shown in FIG. 3B, the resist layer 22 is exposed, developed, and patterned into a resist pattern 22$a$ by photolithography or electron beam lithography.

Next, as shown in FIG. 3C, the region without the resist layer 22 is etched by dry etching or the like. Subsequently, as shown in FIG. 3D, a ferromagnetic thin film 21 made of Co, etc. is formed by sputtering. The ferromagnetic thin film 21 is deposited on both the etched portion of the non-magnetic base 20 and the resist pattern 22$a$. As shown in FIG. 3E, the ferromagnetic thin film 21 on the resist pattern 22$a$ is removed, together with the resist pattern 22$a$, with a chemical solution or the like, thus producing a ferromagnetic thin film pattern 12$p$.

The method for forming the ferromagnetic thin film 21 on the non-magnetic base 20 is not limited to sputtering, and conventionally performed general thin film formation methods, such as vacuum evaporation, ion plating, CVD, and metal plating, can be used.

A material for the ferromagnetic thin film 21 is not limited to Co, and many kinds of magnetic materials can be used, regardless of hard, semi-hard, or soft magnetic material. Examples of the magnetic material include Fe, Co, and Fe—Co alloy. It is preferable that the saturation flux density of the magnetic material should be large enough to generate a sufficient recording magnetic field without depending on the type of a magnetic recording medium on which the preformat information signals are recorded. In particular, when the saturation flux density is 0.8 tesla or less, the signals may not be recorded sufficiently on a magnetic disk having a high coercive force of more than 2000 oersted (159 kA/m) or a flexible desk including a thick magnetic layer. Therefore, the magnetic material having a saturation flux density of not less than 0.8 tesla, preferably not less than 1.0 tesla, is used generally.

The thickness of the ferromagnetic thin film pattern 12$p$ varies with bit length, the saturation magnetization of a magnetic recording layer, and the thickness of the magnetic recording layer. For example, when the bit length is about 1 $\mu$m, the saturation magnetization is about 500 emu/cc (500 kA/m), and the thickness of a magnetic recording layer is about 20 nm, the ferromagnetic thin film pattern 12$p$ may have a thickness of about 50 nm to 500 nm.

In the above manner, the ferromagnetic thin film pattern 12p is formed on the non-magnetic base 20, as shown in FIG. 3E. Next, the process of forming the high-level region 12 and the low-level region 13 is described below.

As shown in FIG. 3F, a resist layer 23 is formed on the non-magnetic base 20 provided with the ferromagnetic thin film pattern 12p. Then, as shown in FIG. 3G, the resist layer 23 is patterned and removed by photolithography or the like so that only the region including the ferromagnetic thin film pattern 12p is covered with the resist layer 23. As shown in FIG. 3H, dry etching or the like is used to remove the outer layer of the region where the resist layer 23 has been removed. Consequently, the etched region becomes the low-level region 13 and the region that is not etched under the resist layer 23 becomes the high-level region 12, and there is a difference in height (level) between the surfaces of the two regions. Thereafter, as shown in FIG. 3I, the remaining resist layer 23 is removed, e.g., with a chemical solution. Thus, a master information carrier 11 is produced, in which the high-level region 12 with the ferromagnetic thin film pattern 12p and the low-level region 13 with no ferromagnetic thin film pattern are formed on the non-magnetic base 20.

The study conducted by the present inventors showed that when a difference in level h (see FIG. 1B) between the surfaces of the high-level region 12 and the low-level region 13 is not less than 3 $\mu$m, the ferromagnetic thin film pattern 12p uniformly can contact a magnetic recording medium. A preferred difference in level h is 10 $\mu$m to 20 $\mu$m. The difference in level h can be made a predetermined value by appropriately selecting the ion etching conditions.

In Embodiment 1, as shown in FIG. 1A, among the edges that define the high-level region 12, the edge 12a located inside in the radial direction (hereinafter, referred to as "inner edge") is not formed near the ferromagnetic thin film pattern 12p, but rather near the central portion of the master information carrier 11. Thus, when the master information carrier 11 is superimposed on a magnetic disk, the inner edge 12a of the high-level region 12 comes into contact with the magnetic disk in the vicinity of a hole edge 1a (indicated by the alternate long and two short dashed line of FIG. 1A) of the magnetic disk. The high-level region 12 can be formed into a desired shape in a simple manner in which only a region that serves as the high-level region is covered with the resist layer by photolithography.

It is also possible to extend the high-level region 12 so that the inner edge 12a is located inside the hole edge 1a of the magnetic disk. In this case, however, when the master information carrier 11 is superimposed on the magnetic disk, the high-level region 12 comes into contact with the hole edge 1a of the magnetic disk. There may be some burrs or foreign substances on the rim of the hole of the magnetic disk, e.g., due to processing the hole and handling the disk. Such burrs or foreign substances may prevent the close contact between the high-level region 12 and the magnetic disk. Therefore, it is preferable that the high-level region 12 should not be in contact with the hole edge 1a of the magnetic disk. Accordingly, it is preferable that the inner edge 12a of the high-level region 12 is located outside the hole edge 1a of the magnetic disk, and that a radial distance d between the inner edge 12a and the hole edge 1a is not less than 0.2 mm.

Further, the preferred distance d is not more than 6 mm. As described above, when the inner edge 12a is spaced from the hole edge 1a, the central portion of the master information carrier 11 is deformed significantly due to exhausting a gas that is contained in an exhaust path between the low-level region 13 and the magnetic disk. This may cause non-uniform contact between the high-level region 12 and the magnetic disk.

An example of the application of Embodiment 1 to magnetic transfer recording for a 3.5-inch magnetic disk is described below.

Figure 4:
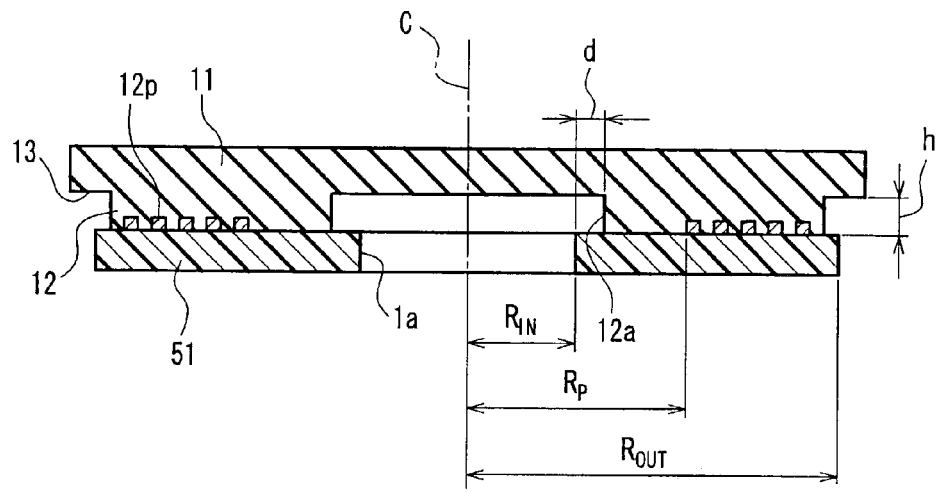
FIG. 4 is a cross-sectional view showing the state in which preformat information signals are recorded on a 3.5-inch magnetic disk by using a master information carrier of Embodiment 1 of the present invention.

FIG. 4 is a cross-sectional view showing the state in which preformat information signals are recorded on a 3.5-inch magnetic disk 51 by using the master information carrier 11 of Embodiment 1. In FIG. 4, the identical elements to those in FIGS. 1A and 1B are denoted by the same reference numerals, and the detailed description thereof will not be repeated.

In FIG. 4, C represents the centerline of the magnetic disk 51 and the master information carrier 11. As shown in FIG. 4, the master information carrier 11 was superimposed on the magnetic disk 51 so that the centerline of the master information carrier 11 matched the centerline of the magnetic disk 51. $R_{IN}$ represents a distance between the centerline C and the hole edge 1a of the magnetic disk 51 (i.e., the radius of a center hole of the magnetic disk 51). $R_{OUT}$ represents a distance between the centerline C and the outer circumferential edge of the magnetic disk 51 (i.e., the radius of the magnetic disk 51). $R_P$ represents a distance between the centerline C and the inner edge of a region for forming the ferromagnetic thin film pattern 12p of the master information carrier 11 (i.e., the innermost radius of the region for forming the ferromagnetic thin film pattern 12p). In this example, $R_{IN}$, $R_{OUT}$, and $R_P$ were set to 12.5 mm, 47.5 mm, and 20.0 mm, respectively. A difference in level (height) h between the surfaces of the high-level region 12 and the low-level region 13 was 5 $\mu$m. The master information carrier 11 was produced with a silicon substrate having an outer diameter of 100 mm and a thickness of 0.525 mm in the manner shown in FIGS. 3A to 3I. The recording wavelength of the preformat information signals recorded on the master information carrier 11 (i.e., the array pitch of the ferromagnetic thin film pattern 12p in the circumferential direction) was 2 $\mu$m.

Next, a gas was exhausted from the hole of the magnetic disk 51 so that the master information carrier 11 came into close contact with the magnetic disk 51. The exhaust pressure was −50 kPa with respect to atmospheric pressure.

Thereafter, a direct external magnetic field (not shown) was applied to allow information signals that corresponded to the ferromagnetic thin film pattern 12p formed on the master information carrier 11 to be transferred and recorded onto the magnetic disk 51.

In this example, a plurality of master information carriers 11 that differed from each other only in the distance between the centerline C and the inner edge 12a of the high-level region 12 were produced and used to record preformat information signals on the magnetic disks 51 under the same conditions.

Figure 5:
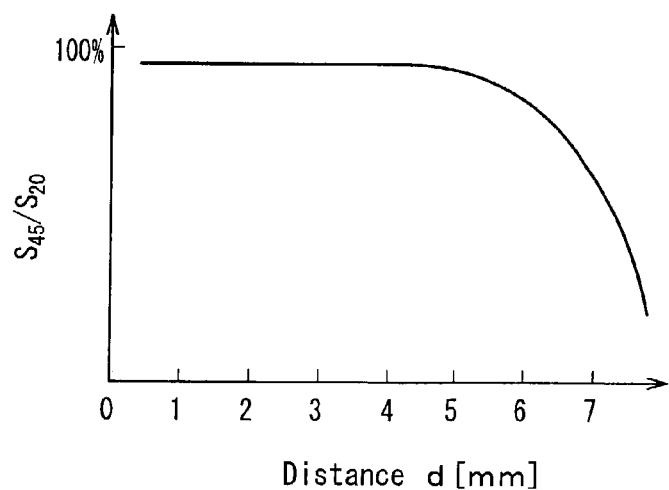
FIG. 5 is a graph that plots a change in strength of a signal recorded on the outer circumferential portion of a magnetic disk against a radial distance d between the inner edge of the high-level region of a master information carrier and the hole edge of the magnetic disk.

For each of the magnetic disks 51 thus obtained, a $S_{45}/S_{20}$ ratio, i.e., the ratio of the reproduction output value $S_{45}$ of a signal recorded on any point at a radius of 45 mm from the centerline C to the reproduction output value $S_{20}$ of a signal recorded on any point at a radius of 20 mm from the centerline C was determined. FIG. 5 shows the results. The horizontal axis of the graph in FIG. 5 indicates the radial distance d between the inner edge 12a of the high-level region 12 of the master information carrier 11 and the hole edge 1a of the magnetic disk 51. The graph shows that the $S_{45}/S_{20}$ ratio dropped sharply when the distance d was more than 6 mm. This is because the outer circumference of the master information carrier 11 was raised from the magnetic disk 51 due to the exhausting, and thus the close contact between the master information carrier 11 and the magnetic disk 51 was degraded. The experiment proved that the preferred distance d is not more than 6 mm.

In the above example, the recording wavelength of the preformat information signals was 2 µm. When the same experiment was performed by changing the recording wavelength to 1 µm, the $S_{45}/S_{20}$ ratio started to drop with the distance d of about 2 mm. Therefore, it is preferable that the distance d is not more than 2 mm to achieve even higher recording density.

Figure 6A:
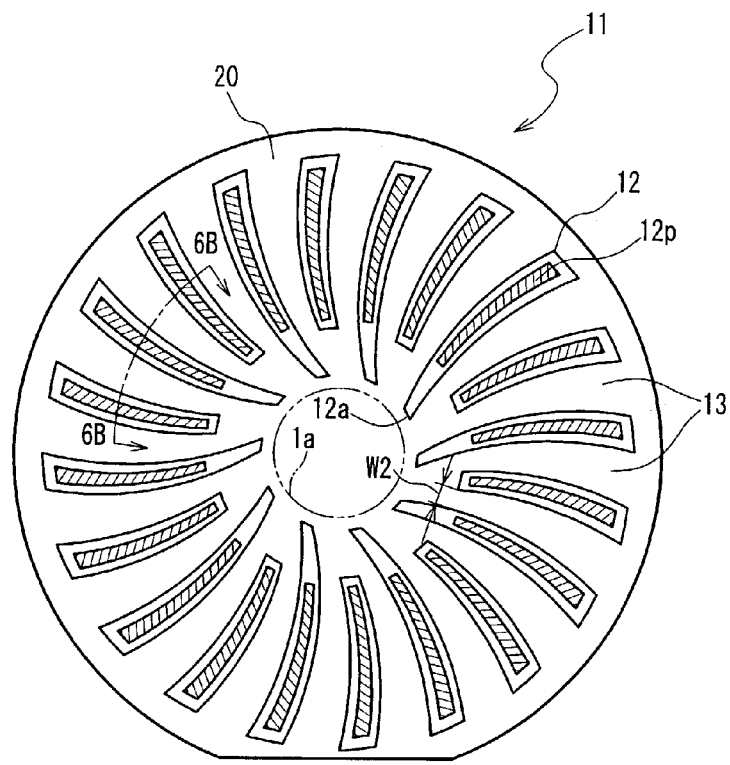
FIG. 6A is a plan view schematically showing the configuration of another master information carrier of Embodiment 1 of the present invention.

For the master information carrier 11 in FIG. 1A, the inner edge 12a of every high-level region 12 is formed near the hole edge 1a of the magnetic disk. However, as shown in FIG. 6A, only some of the high-level regions 12 may be extended near the hole edge 1a. In the example of a master information carrier of FIG. 6A, the high-level regions 12 having the extended inner edge 12a are arranged alternately with those having the non-extended edge 12a. This configuration also can provide the same effect as that in FIG. 1A.

Figure 6B:
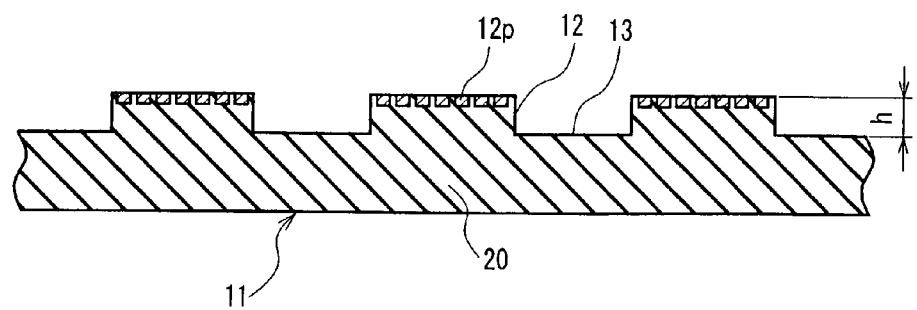
FIG. 6B is an enlarged cross-sectional view taken along the arc 6B—6B of FIG. 6A.

In the example of a master information carrier of FIG. 1A, the minimum distance between adjacent high-level regions 12 is indicated by w1 at the inner edges 12a (see FIG. 1A). In the example of a master information carrier of FIG. 6A, the minimum distance between adjacent high-level regions 12 is indicated by w2, as shown in FIG. 6A. When the number of high-level regions is increased or when the distance from the center to the inner edge 12a is small, the spacing between adjacent high-level regions 12 is reduced. This makes it difficult to exhaust a gas contained in a space between the magnetic disk and the low-level region 13 that is formed between the high-level regions 12. Thus, sufficient negative pressure may not be generated. The master information carrier of FIG. 6A can ensure the generation of negative pressure in the space between the low-level region 13 and the magnetic disk, thereby achieving uniform contact between the high-level regions 12 and the magnetic disk. Consequently, a more highly reliable master information carrier can be provided. FIG. 6B is an enlarged cross-sectional view of the master information disk 11 taken along the alternate long and short dashed line 6B—6B of FIG. 6A.

Embodiment 2

Figure 7A:
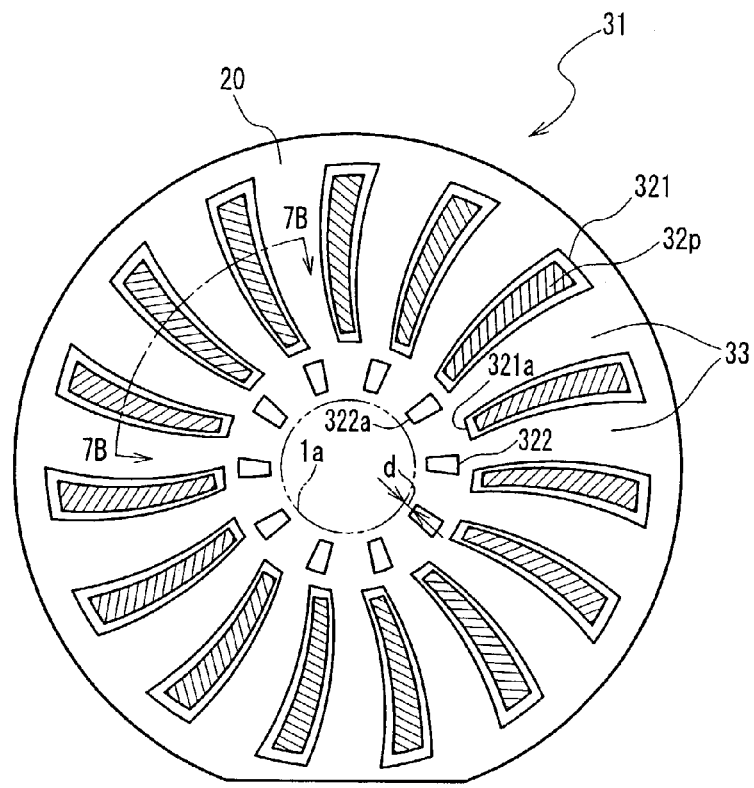
FIG. 7A is a plan view schematically showing the configuration of a master information carrier of Embodiment 2 of the present invention.
Figure 7B:
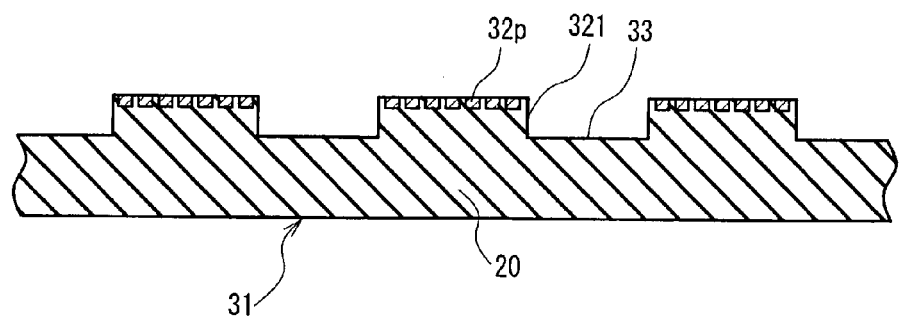
FIG. 7B is an enlarged cross-sectional view taken along the arc 7B—7B of FIG. 7A.

FIGS. 7A and 7B show the configuration of a master information carrier of Embodiment 2 of the present invention. FIG. 7A is a plan view of a disk-shaped master information carrier 31, on which narrow regions 321 that extend substantially in the radial direction are arranged at predetermined angular intervals in the circumferential direction. Each of the regions 321 includes a region where a fine ferromagnetic thin film pattern 32p (indicated by hatching) is formed so as to correspond to preformat information signals. FIG. 7B is an enlarged cross-sectional view of the master information carrier 31 taken along the alternate long and short dashed line 7B—7B of FIG. 7A. As shown in FIG. 7B, the surface level of a region 33 (non-patterned region), where no ferromagnetic thin film pattern is formed, is lower than the surface level of the region 321 that includes a region (patterned region) where the ferromagnetic thin film pattern 32p is formed. The region 321 with a higher surface level is referred to as a first high-level region, while the region 33 with a lower surface level is referred to as a low-level region. Both the first high-level region 321 and the low-level region 33 are provided in the surface of a non-magnetic base 20. The master information carrier 31 further includes a second high-level region 322, in addition to the first high-level region 321 where the ferromagnetic thin film pattern 32p is formed. The second high-level region 322 is substantially the same as the first high-level region 321 in height and formed on the surface of the non-magnetic base 20. The second high-level region 322 does not include any ferromagnetic thin film pattern.

For convenience, FIGS. 7A and 7B are simplified. Actually, however, the size and number of regions that include the ferromagnetic thin film pattern 32p differ from those illustrated in the drawings, and in reality the master information carrier has, e.g., about 100 to 300 first high-level regions 321.

Since the details of the ferromagnetic thin film patters 32p provided in the first high-level region 321 and the method for forming the ferromagnetic thin film pattern 32p on the non-magnetic base 20 are the same as those explained in Embodiment 1, the description thereof will not be repeated (see FIGS. 2 and 3A to 3I).

Moreover, the method for making the surface level of the low-level region 33 lower than the surface level of each of the first and second high-level regions 321, 322 also is the same as that in Embodiment 1 (see FIGS. 3A to 3I).

After a resist layer is formed on the base provided with the ferromagnetic thin film pattern, the resist layer is patterned and removed by photolithography or the like so that only regions to be formed into the first and the second high-level region 321, 322 are covered with the resist layer. Then, dry etching or the like is used to remove the outer layer of the region where the resist layer has been removed. Consequently, the etched region becomes the low-level region 33 and the regions that are not etched under the resist layer become the first and the second high-level region 321, 322, and there is a difference in height (level) between the surfaces of the low-level region and the first or the second high-level region. Thereafter, the remaining resist layer is removed, e.g., with a chemical solution. Thus, a master information carrier 33 is produced in which the first high-level region 321 with the ferromagnetic thin film pattern 32p, the second high-level region 322 with no ferromagnetic thin film pattern, and the low-level region 33 with no ferromagnetic thin film pattern are formed on the non-magnetic base.

In Embodiment 2, as shown in FIG. 7A, among the edges that define the first high-level region 321, the edge 321a located inside in the radial direction (hereinafter, referred to as "inner edge") is in the vicinity of the inner edge of a region for forming the ferromagnetic thin film pattern 32p. When the master information carrier in this state is superimposed on a magnetic disk, and then a gas contained in an exhaust path between the low-level region 33 and the magnetic disk is exhausted from the hole of the magnetic disk so that the ferromagnetic thin film pattern 32p comes into close contact with the magnetic disk, the central portion of the master information carrier 31 is deformed, as described above. Thus, the close contact between the ferromagnetic thin film pattern 32p and the magnetic disk is degraded. To prevent such degradation, Embodiment 2 allows a second high-level region 322 to be formed further inside the inner edge 321a of the first high-level region 321 in the radial direction. The second high-level region 322 can have any shape, such as a rectangle and circle. It is preferable that the position and the size of the second high-level region 322 are set so that when the master information carrier 31 is superimposed on a magnetic disk, the second high-level region 322 does not come into contact with a hole edge 1a of the magnetic disk. There may be some burrs or foreign substances on the rim of the hole of the magnetic disk, e.g., due to processing the hole and handling the disk at the time of manufacture. Such burrs or foreign substances may prevent the close contact between the ferromagnetic thin film pattern and the magnetic disk. Therefore, it is preferable that the edge ("inner edge") 322a of the second high-level region 322 that is closest to the central portion of the master information carrier 31 is located outside the hole edge 1a of the magnetic disk when the master information carrier 31 is superimposed on the magnetic disk. Specifically, like Embodiment 1, a radial distance d between the inner edge 322a and the hole edge 1a is preferably in the range of 0.2 mm to 6 mm (more preferably, in the range of 0.2 mm to 2 mm).

The number of second high-level regions 322 is preferably in the range from one-fourth the number of first high-level regions 321 to the number of first high-level regions 321, and more preferably about half the number of first high-level regions 321. When the size of each second high-level region 322 is small and the number also is small, large pressure is exerted on the contact portions between the second high-level regions 322 and the magnetic disk in the process of bringing the master information carrier 31 into close contact with the magnetic disk. Thus, the magnetic disk may be damaged. On the other hand, when the size of each second high-level region 322 is large and the number also is large, it becomes difficult to exhaust a gas from a space between the magnetic disk and the low-level region 33 that is placed between the first high-level regions 321. Thus, sufficiently close contact may not be achieved easily.

In either case, the second high-level region 322 as well as the first high-level region 321 including the ferromagnetic thin film pattern 32p can be formed easily by photolithography, regardless of the size, position, and number. By forming the second high-level regions 322 on the non-magnetic base 20, deformation of the master information carrier 31 due to exhausting a gas from the hole of the magnetic disk can be minimized in the process of bringing the master information carrier 31 into close contact with the magnetic disk, thus ensuring uniform contact between the first high-level regions 321 and the magnetic disk. Consequently, a highly reliable master information carrier can be provided.

In FIG. 7A, two types of high-level regions 321, 322 are formed: first and second. However, the type of high-level regions is not limited thereto. For example, another high-level region whose height is substantially the same as that of the first and the second high-level region may be arranged inside the inner edge 321a of the first high-level region 321. Moreover, this high-level region can be formed either with or without the ferromagnetic thin film pattern.

In Embodiments 1 and 2, the ferromagnetic thin film patterns 12p, 32p formed on the master information carriers 11, 31 are buried in the upper surfaces of the high-level regions 12, 321, respectively. However, the ferromagnetic thin film patterns 12p, 32p can protrude from the upper surfaces of the high-level regions 12, 321. A method for forming such a ferromagnetic thin film pattern is described by referring to FIGS. 8A to 8H.

Figure 8A:
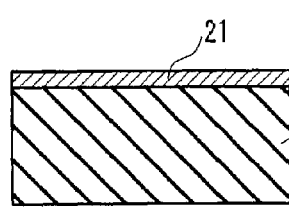
FIGS. 8A to 8H are cross-sectional views showing an example of another method for manufacturing a master information carrier of the present invention in the order of process.

As shown in FIG. 8A, a ferromagnetic thin film 21 made of Co, etc. is deposited on the smooth and flat surface of a non-magnetic base 20, such as glass or a silicon wafer, by sputtering or the like.

Figure 8B:
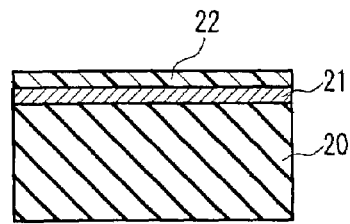
Figure 8C:
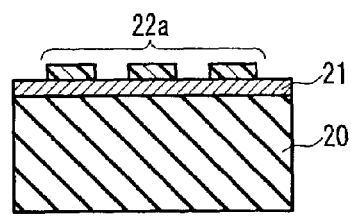
Figure 8D:
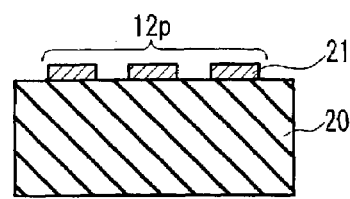

Then, as shown in FIG. 8B, a resist layer 22 is formed on the ferromagnetic thin film 21. As shown in FIG. 8C, the resist layer 22 is exposed, developed, and patterned into a resist pattern 22a by photolithography or electron beam lithography. Thereafter, as shown in FIG. 8D, a ferromagnetic thin film pattern 12p is formed by dry etching or the like.

Next, a high-level region and a low-level region are formed in the following processes.

Figure 8E:
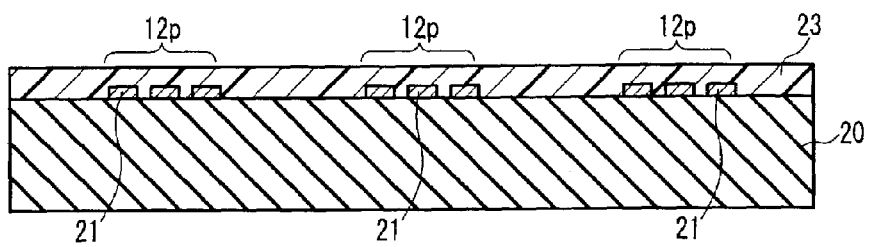
Figure 8F:
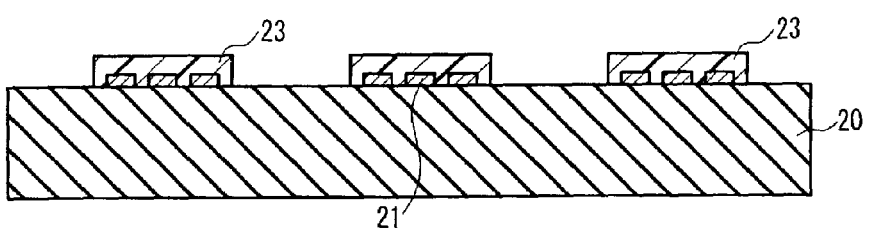
Figure 8G:
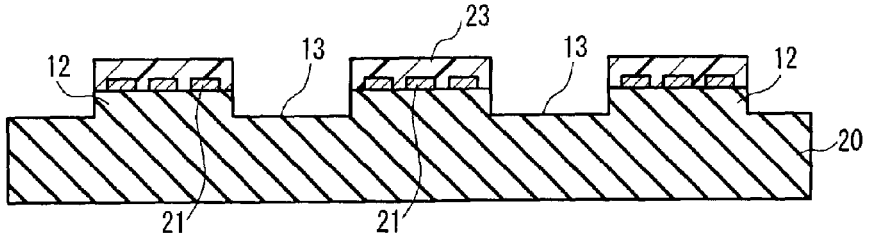
Figure 8H:
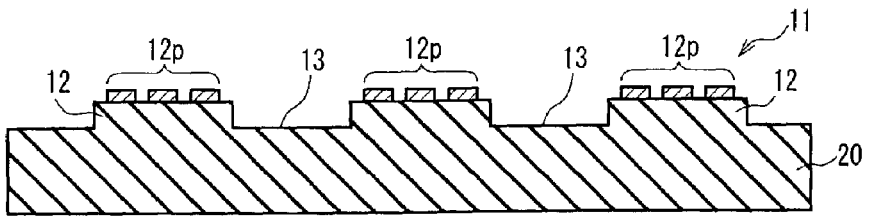

As shown in FIG. 8E, a resist layer 23 is formed on the non-magnetic base 20 provided with the ferromagnetic thin film pattern 12p. Then, as shown in FIG. 8F, the resist layer 23 is patterned and removed by photolithography or the like so that only the region including the ferromagnetic thin film pattern 12p is covered with the resist layer 23. As shown in FIG. 8G, dry etching or the like is used to remove the outer layer of the region where the resist layer 23 has been removed. Consequently, the etched region becomes the low-level region 13 and the region that is not etched under the resist layer 23 becomes the high-level region 12, and there is a difference in height (level) between the surfaces of the two regions. Thereafter, as shown in FIG. 8H, the remaining resist layer 23 is removed, e.g., with a chemical solution.

Thus, a master information carrier 11 is produced, in which the high-level region 12 from which the ferromagnetic thin film pattern 12p is protruded and the low-level region 13 with no ferromagnetic thin film pattern are formed on the non-magnetic base 20.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A master information carrier comprising:
   a disk-shaped base;
   a high-level region;
   a low-level region differing from the high-level region in level; and
   a ferromagnetic thin film pattern formed in a surface of the high-level region so as to correspond to an information signal,
   the high-level region, the low-level region, and the ferromagnetic thin film pattern being provided on the disk-shaped base,
   wherein the master information carrier is to be superimposed on a magnetic disk with the ferromagnetic thin film pattern in close contact with a surface of the magnetic disk, and application of an external magnetic field allows the information signal to be transferred and recorded onto the magnetic disk, and
   wherein when the master information carrier is superimposed on the magnetic disk, an inner edge of the high-level region is located outside a hole edge of the magnetic disk in a radial direction, and a radial distance between the inner edge and the hole edge is not less than 0.2 mm and at least a portion of the high-level region comes into contact with the vicinity of a hole edge of the magnetic disk.

2. The master information carrier according to claim 1, wherein when the master information carrier is superimposed on the magnetic disk, a radial distance between the inner edge and the hole edge is not more than 6 mm.

3. A method for manufacturing a magnetic disk comprising:
   superimposing the master information carrier according to claim 1 on a magnetic disk;

bringing the master information carrier into close contact with the magnetic disk by exhausting a gas from a hole of the magnetic disk to generate negative pressure in a space between the master information carrier and the magnetic disk; and transferring and recording an information signal onto the magnetic disk by application of an external magnetic field, the information signal corresponding to the ferromagnetic thin film pattern formed on the master information carrier.

4. A master information carrier comprising:

a disk-shaped base;

a first high-level region and a second high-level region, the first high-level region being flush substantially with the second high-level region;

a low-level region differing from the first high-level region and the second high-level region in level; and a ferromagnetic thin film pattern formed in a surface of the first high-level region so as to correspond to an information signal, the first high-level region, the second high-level region, the low-level region, and the ferromagnetic thin film pattern being provided on the disk-shaped base, wherein the master information carrier is to be superimposed on a magnetic disk with the ferromagnetic thin film pattern in close contact with a surface of the magnetic disk, and application of an external magnetic field allows the information signal to be transferred and recorded onto the magnetic disk, and wherein when the master information carrier is superimposed on the magnetic disk, an inner edge of the high-level region is located outside a hole edge of the magnetic disk in a radial direction, and a radial distance between the inner edge and the hole edge is not less than 0.2 mm at least a portion of the second high-level region comes into contact with the vicinity of a hole edge of the magnetic disk.

5. The master information carrier according to claim 4, wherein when the master information carrier is superimposed on the magnetic disk, a radial distance between the inner edge and the hole edge is not more than 6 mm.

6. The master information carrier according to claim 4, wherein a plurality of first high-level regions and a plurality of second high-level regions are provided, and the number of second high-level regions is not more than the number of first high-level regions and not less than one-fourth the number of first high-level regions.

7. A method for manufacturing a magnetic disk comprising:

superimposing the master information carrier according to claim 4 on a magnetic disk;

bringing the master information carrier into close contact with the magnetic disk by exhausting a gas from a hole of the magnetic disk to generate negative pressure in a space between the master information carrier and the magnetic disk; and transferring and recording an information signal onto the magnetic disk by application of an external magnetic field, the information signal corresponding to the ferromagnetic thin film pattern formed on the master information carrier.

* * * * *

UNITED STATES PATENT AND TRADEMARK OFFICE
CERTIFICATE OF CORRECTION

| | |
|---|---|
| PATENT NO. | : 6,980,380 B2 |
| APPLICATION NO. | : 10/330172 |
| DATED | : December 27, 2005 |
| INVENTOR(S) | : Miyata et al. |

It is certified that error appears in the above-identified patent and that said Letters Patent is hereby corrected as shown below:

Col. 17, line 32: "edge of the high-level region" should read --edge of the second high-level region--

Signed and Sealed this

Twenty-ninth Day of August, 2006

JON W. DUDAS
*Director of the United States Patent and Trademark Office*